UNITED STATES PATENT OFFICE.

WILLIAM L. DUDLEY, OF NASHVILLE, TENNESSEE.

MAGNESIA-CEMENT COMPOSITION.

No. 839,820.  Specification of Letters Patent.  Patented Jan. 1, 1907.

Application filed August 17, 1906. Serial No. 331,058.

*To all whom it may concern:*

Be it known that I, WILLIAM L. DUDLEY, a citizen of the United States, residing at Nashville, in the county of Davidson and State of Tennessee, have invented certain new and useful Improvements in Magnesia-Cement Composition; and I do hereby declare the following to be a full, clear, and exact description of the invention, such as will enable others skilled in the art to which it appertains to make and use the same.

My invention relates to a composition of matter which is especially adapted for use as a flooring, and has for its object the production of an artificial stone which is tough, resilient, but slightly absorbent or hygroscopic, and which does not shrink, swell, crack, or warp to any appreciable extent.

One of the principal features of my invention resides in the use of waterproofed sawdust as an element of the cement composition.

In making the cement or artificial stone according to my invention it is preferred to combine crushed granite, quartz, sand, clay, marble, or any other similar inert substance, which has been ground reasonably fine, with magnesium oxid, pulverized, disintegrated, or ground sawdust or cellulose fiber, and asbestos, adding such coloring-matter as may be desired. Asbestos, however, is not an essential constituent of the composition, and the calcined magnesite may be replaced by or mixed with calcined dolomite, the proportion of calcined dolomite being then greater than the calcined magnesite for which it is substituted.

In the claims appended to this specification calcined dolomite is considered the equivalent of magnesium oxid wherever the latter is specified.

When the cement is to be used, it is made into a thick mortar by the addition of an aqueous solution of magnesium chlorid of about 24° Baumé and is laid or molded in any suitable manner.

The several materials forming the composition are each ground or disintegrated to the proper degree of fineness, and after the proper proportion of each is added the whole mass is thoroughly ground and mixed together.

Before the sawdust or fiber is added to the mixture, however, it is first rendered waterproof, as by being treated with asphalt, ozokerite, or paraffin dissolved in the proper solvent. I prefer to use the paraffin for this purpose, and to this end a solution consisting of about one pound of paraffin dissolved in one gallon of petroleum naphtha may be effectually employed. After being thoroughly dried the sawdust is sprinkled or sprayed with the paraffin solution and is meanwhile stirred or agitated until it becomes completely saturated. This method of rendering the sawdust non-absorbent requires about one gallon of the paraffin solution for thirty-six pounds of dry sawdust or fiber. From the sawdust or fiber thus treated the solvent employed is distilled off and recovered by condensation, or it may be allowed to evaporate. By thus treating the sawdust or fiber the wood is preserved from decay and rendered impervious to moisture and to the magnesium chlorid, and therefore a less amount of such magnesium-chlorid solution is necessary in forming the cement. The cement when set is also thus rendered tougher, more resilient, and less absorbent.

Instead of adopting the method of waterproofing by spraying and stirring, as heretofore described, the sawdust or fiber may be simply dipped into the solution employed for that purpose.

While the relative proportions of the several ingredients are susceptible of variation, an excellent composition may be made by the admixture of the following constituents in the proportions, by weight, stated: fifty parts of crushed granite, quartz, sand, clay, marble or other similar inert substance, thirty parts of magnesium oxid, fifteen parts of waterproofed sawdust or fiber, and five parts of asbestos, the mixture to be prepared and made into a mortar with an aqueous solution of magnesium chlorid, as previously described.

As heretofore stated, the mixture may be made without asbestos, and in such case the proportion of sawdust or fiber may be increased proportionately.

The foregoing mixture makes a smooth and uniform mortar, which may be readily spread or molded. When, for example, it is laid as a floor upon a wooden or concrete base, it may be spread about one-half inch thick without danger of cracking or warping, and by reason of the character of the composition it is found to be unnecessary to provide cuts or expansion-joints to compensate for changes in temperature.

Having thus described my invention, what I claim, and desire to secure by Letters Patent, is—

1. A magnesia-cement composition containing an initially-waterproofed absorbent substance.

2. A magnesia-cement composition containing initially-waterproofed cellulose fiber.

3. A magnesia-cement composition containing an absorbent substance treated with paraffin.

4. A magnesia-cement composition containing an absorbent substance saturated with a solution of dissolved paraffin and subsequently freed from the paraffin solvent.

5. A magnesia-cement composition containing an absorbent substance saturated with a solution of paraffin dissolved in petroleum naphtha and subsequently freed from the naphtha.

6. A magnesia-cement composition containing cellulose fiber saturated with a solution of dissolved paraffin and subsequently freed from the paraffin solvent.

7. A magnesia-cement composition containing cellulose fiber saturated with a solution of paraffin dissolved in petroleum naphtha and subsequently freed from the naphtha.

8. A magnesia-cement composition containing cellulose fiber treated with paraffin.

9. A magnesia-cement composition containing an absorbent substance initially treated to render it impervious to a solution of magnesium chlorid.

10. A magnesia-cement composition containing cellulose fiber initially treated to render it impervious to a solution of magnesium chlorid.

11. A magnesia-cement composition containing an inert substance, magnesium oxid, and an initially-waterproofed absorbent substance.

12. A magnesia-cement composition containing an inert substance, magnesium oxid, an initially-waterproofed absorbent substance, and asbestos.

13. A magnesia-cement composition containing an inert substance, magnesium oxid, and initially-waterproofed cellulose fiber.

14. A magnesia-cement composition containing an inert substance, magnesium oxid, initially-waterproofed cellulose fiber, and asbestos.

15. A magnesia-cement composition containing an inert substance, magnesium oxid, and an absorbent substance initially treated to render it impervious to magnesium chlorid.

16. A magnesia-cement composition containing an inert substance, magnesium oxid, an absorbent substance initially treated to render it impervious to magnesium chlorid, and asbestos.

17. A magnesia-cement composition containing an inert substance, magnesium oxid, and cellulose fiber treated with paraffin.

18. A magnesia-cement composition containing an inert substance, magnesium oxid, cellulose fiber treated with paraffin, and asbestos.

19. A composition of matter composed of an inert substance, magnesium oxid, initially-waterproofed cellulose fiber, and magnesium chlorid.

20. A composition of matter composed of an inert substance, magnesium oxid, initially-waterproofed cellulose fiber, asbestos and magnesium chlorid.

21. A magnesia-cement composition containing magnesium chlorid, magnesium oxid, and an absorbent substance which prior to incorporation with the magnesium chlorid has been treated with a substance impervious to the latter.

In testimony whereof I affix my signature in presence of two subscribing witnesses.

WILLIAM L. DUDLEY.

Witnesses:
ROBERT EWING,
THOS. G. KITTRELL.